US006801323B2

United States Patent
Evans

(10) Patent No.: US 6,801,323 B2
(45) Date of Patent: Oct. 5, 2004

(54) METHODS AND APPARATUS FOR INTERFEROMETRIC DIMENSIONAL METROLOGY

(75) Inventor: Christopher James Evans, Higganum, CT (US)

(73) Assignee: Zygo Corporation, Middlefield, CT (US)

(*) Notice: Subject to any disclaimer, the term of this patent is extended or adjusted under 35 U.S.C. 154(b) by 197 days.

(21) Appl. No.: 10/272,168

(22) Filed: Oct. 16, 2002

(65) Prior Publication Data

US 2003/0090677 A1 May 15, 2003

Related U.S. Application Data

(60) Provisional application No. 60/332,604, filed on Nov. 14, 2001.

(51) Int. Cl.[7] .................................................. G01B 9/02
(52) U.S. Cl. ...................................... 356/513; 356/519
(58) Field of Search .............................. 356/489, 495, 356/511, 512, 513, 515, 517

(56) References Cited

U.S. PATENT DOCUMENTS

| | | | | |
|---|---|---|---|---|
| 4,872,755 A | * | 10/1989 | Kuchel | 356/495 |
| 5,625,454 A | * | 4/1997 | Huang et al. | 356/513 |
| 5,933,236 A | | 8/1999 | Sommargren | |

OTHER PUBLICATIONS

Schmitz, T. Davies, A., and Evans, C., "Uncertainties in radius of curvature measurement", SPIE paper, (Jul. 2001).
Selberg, Lars A., "Radius measurement by interferometry", Optical Engineering, vol. 31, No. 9, pp 1961–1966 (Sep. 1992).

* cited by examiner

Primary Examiner—Samuel A. Turner
Assistant Examiner—Patrick Connolly
(74) Attorney, Agent, or Firm—Francis J. Caufield

(57) ABSTRACT

Apparatus and methodology by which the radius of curvature of individual optics may be determined through the interferometric measurement of the optical length of a spherical cavity established from null tests of combinations of the individual optics and an algorithm that mutually intercompares the measured cavity lengths and radii of curvature of the individual optics.

4 Claims, 3 Drawing Sheets

METHODS AND APPARATUS FOR INTERFEROMETRIC DIMENSIONAL METROLOGY

CROSS REFERENCE TO RELATED APPLICATION

This application claims priority from U.S. Provisional Patent Application No. 60/332,604 filed on Nov. 14, 2001 in the name of Christopher James Evans for "Methods And Apparatus For Interferometric Dimensional Metrology", the contents of which are incorporated herein by reference in their entirety.

BACKGROUND OF THE INVENTION

This invention generally relates to interferometry and, more particularly, to apparatus and methods for measuring the radii of curvature of optical components.

Displacement measuring interferometers (DMIs) can provide very low uncertainties in a variety of measurement applications. One disadvantage of such devices in some applications is that they have no inherent "zero". In machine tool applications, for example, it is common to provide an encoder pulse or electromechanical switch to provide such a zero, albeit at greater uncertainty levels than the displacement measurement.

Phase measuring Fizeau interferometers are widely used for measuring the shape of components, such as optical surfaces, as well as transmitted wavefront and certain optical properties. Such instruments typically require a long coherence length source, which can cause problems with scattered light. In addition, the height information extracted is modulo $2\pi$, so it is very difficult to do dimensional measurements (as opposed to surface deviation measurement) using such devices.

In advanced optics, there is a particular need to measure the radii of curvature of lenses and mirrors. Typical applications where very low uncertainties are desired in such measurements include lenses for photolithography tools that produce integrated circuits, micro-optics for telecommunications applications, etc.

Accordingly, it is a primary object of the present invention to provide an interferometric "zero" for DMIs.

Another object of this invention is to facilitate dimensional metrology using Fizeau interferometry.

It is a further object of this invention to provide a general self-calibration method for measuring radii of curvature.

Another object of this invention is to provide comparative, optical methods for measuring radii of curvature.

Other objects of the invention will, in part, be obvious and will, in part, appear hereinafter when the following description is read in connection with the drawings.

SUMMARY OF THE INVENTION

A self-calibration method for measuring radii of curvature of spherical optical surfaces based on measurement of three optics in pairwise combinations is provided. With a calibrated reference radius available, measurements of other radii can be made directly, given the ability to measure the internal length of an interferometric cavity.

The required measurement is made, for example, by using a delay line interferometer provided with a "zero". Adding a short coherence length source and an appropriate detector to a displacement measuring interferometer makes it possible to detect (using algorithms developed for "scanning white light interferometry" (SWLI)) the point when the two arms of the DMI are exactly balanced. This balanced point can be used as a highly repeatable "zero", or reference point for subsequent absolute length measurements.

The fixed, reference arm of the DMI is provided with some adjustment so that the reference point can be adjusted to coincide with some external (for example) mechanical reference in the specific application.

Here, a DMI is used as the delay line in a Fizeau, and the arms of the DMI are exactly balanced to obtain two coherent reflections from the reference surface and two from the test surface. The distance the DMI has to be moved to get one coherent reflection from the test surface and one from the reference surface is the internal length of the Fizeau cavity, and can be measured to very low uncertainties. SWLI can be used to identify the peak of the coherence envelope to sub-nanometer uncertainty. Hence, dimensional metrology can be performed in a Fizeau cavity—for example—measuring thickness, flatness and parallelism in a single set up, measuring refractive index, etc.

In a spherical Fizeau cavity adjusted so that:

(1) the incident wave is exactly normal to the reference surface, so that the radius of curvature of the reference surface is exactly the radius of curvature of the wavefront; and (2) the cavity length is adjusted so that there is no variation in average phase radially (i.e., the cavity is perfectly nulled), the cavity length is the sum of the radii of curvature of the test and reference surfaces. When three surfaces are intercompared, pairwise, in such an architecture, the three measured lengths can be solved to give the individual radii of curvature.

The inventive algorithm may be implemented with any scheme that measures the length of the interferometric cavity. Examples include, but are not limited to, Fourier Transform Phase Shifting interferometry (FTPSI), or multi-color interferometry.

BRIEF DESCRIPTION OF THE DRAWINGS

The structure, operation, and methodology of the invention, together with other objects and advantages thereof, may best be understood by reading the detailed description in connection with the drawings in which each part has an assigned a descriptive label or numeral that identifies it wherever it appears in the various drawings and wherein.

DETAILED DESCRIPTION OF THE INVENTION

Figure 1:
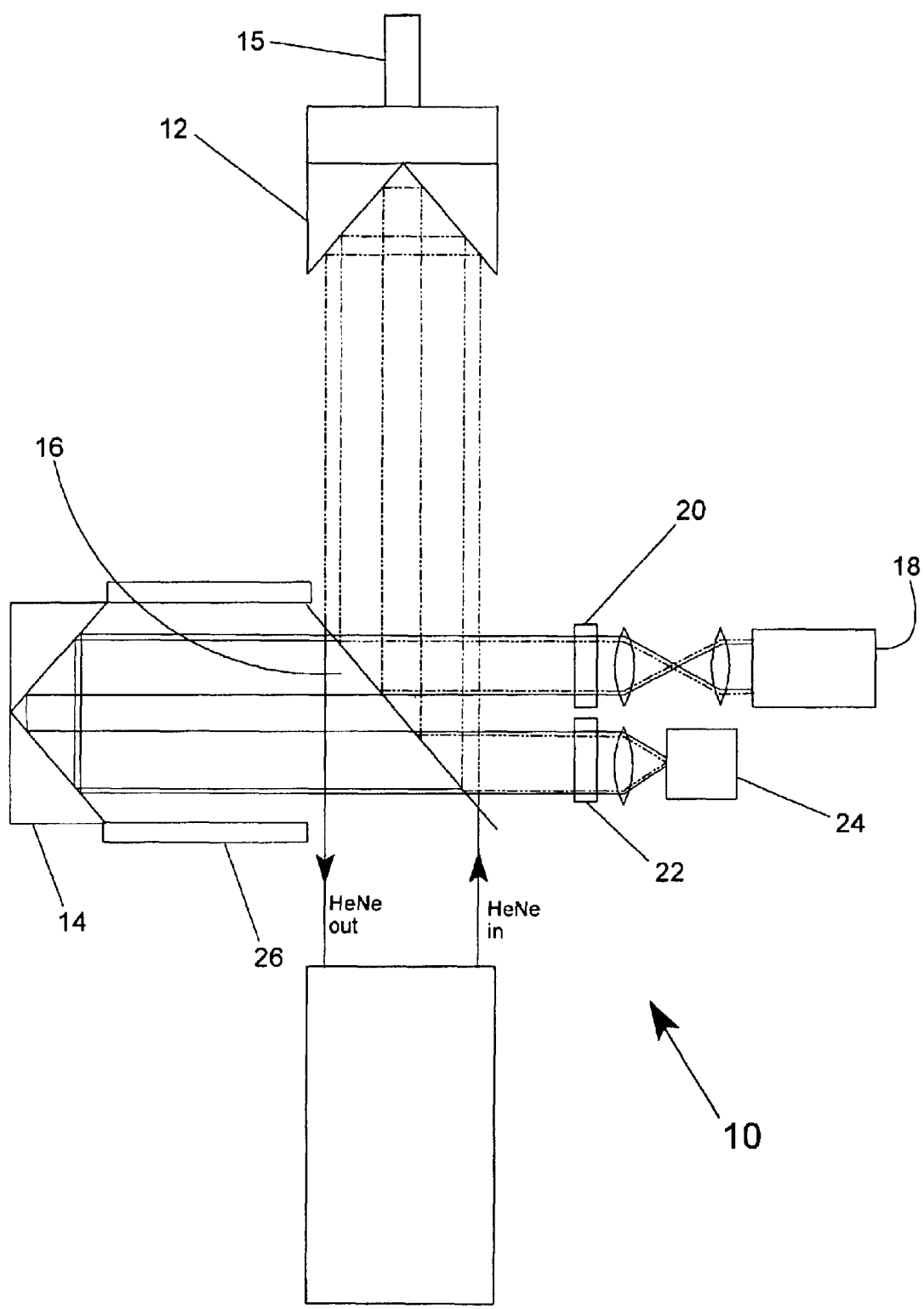
FIG. 1 is a diagrammatic plan view of a distance measuring interferometer system (DMI) having an interferometrically provided reference point in accordance with the invention.

Current DMIs, such as that generally designated at 10 in FIG. 1, typically measure the movement of a target 12 (typically a retroreflector) with respect to a fixed reference retroreflector 14, which is frequently mounted directly to a polarizing beamsplitter 16. Motion of the target or retroreflector 12 is via rail 15 and a well-known precision controller. There is no usually no inherent reference point for the displacement measurement since only relative displacements are possible in the typical arrangement. FIG. 1, however, also illustrates how a reference point may be provided interferometrically.

Here, a second, short coherence length light source 18 is added. Source 18 runs at a slightly different wavelength than the HeNe in the DMI 10. A rotatable linear polarizer 20 is provided, depending on source characteristics, along with an optional filter 22, a detector 24, and a spacer 26. Light from the second source 18 is separated into two beams by beamsplitter 16. One beam traverses the reference retroreflector 14 (reference arm of the interferometer) and is directed via the filter 22 to detector 24 where it is combined with the second beam that traverses the test arm via the moving retroreflector or target 12. Filter 22 operates to reject light from the HeNe and hence avoid saturating detector 24.

When the length of the two arms of the DMI is within the coherence length of source 18, interference occurs. The test arm length may be adjusted until the peak of the coherence envelope (and zero phase difference) is found, at which point the optical lengths of the cavity are equal. Note that spacer 26 has been added between the reference retroreflector 14 and the beamsplitter 16 to ensure that the moving retroreflector 12 does not touch beamsplitter 16.

When the arms of the interferometer are of matched length, they are also optically identical. Hence, a simple extended source, such as small bulb, filament, etc. with an appropriate condenser and filter, if desired, may be used. The short coherence light source may also be fiber fed, suggesting a superluminescent diode, a laser diode operating below critical, etc.

In applications such as high precision machine tools or photolithography tools, it may be desirable to set the reference point for the displacement measuring interferometer to match some other reference position in the particular application. This can easily be achieved by providing for adjustment of the length of the spacer 26 (or other mechanical assembly) that locates the fixed, reference retroreflector 14 with respect to the beamsplitter 16.

Figure 2:
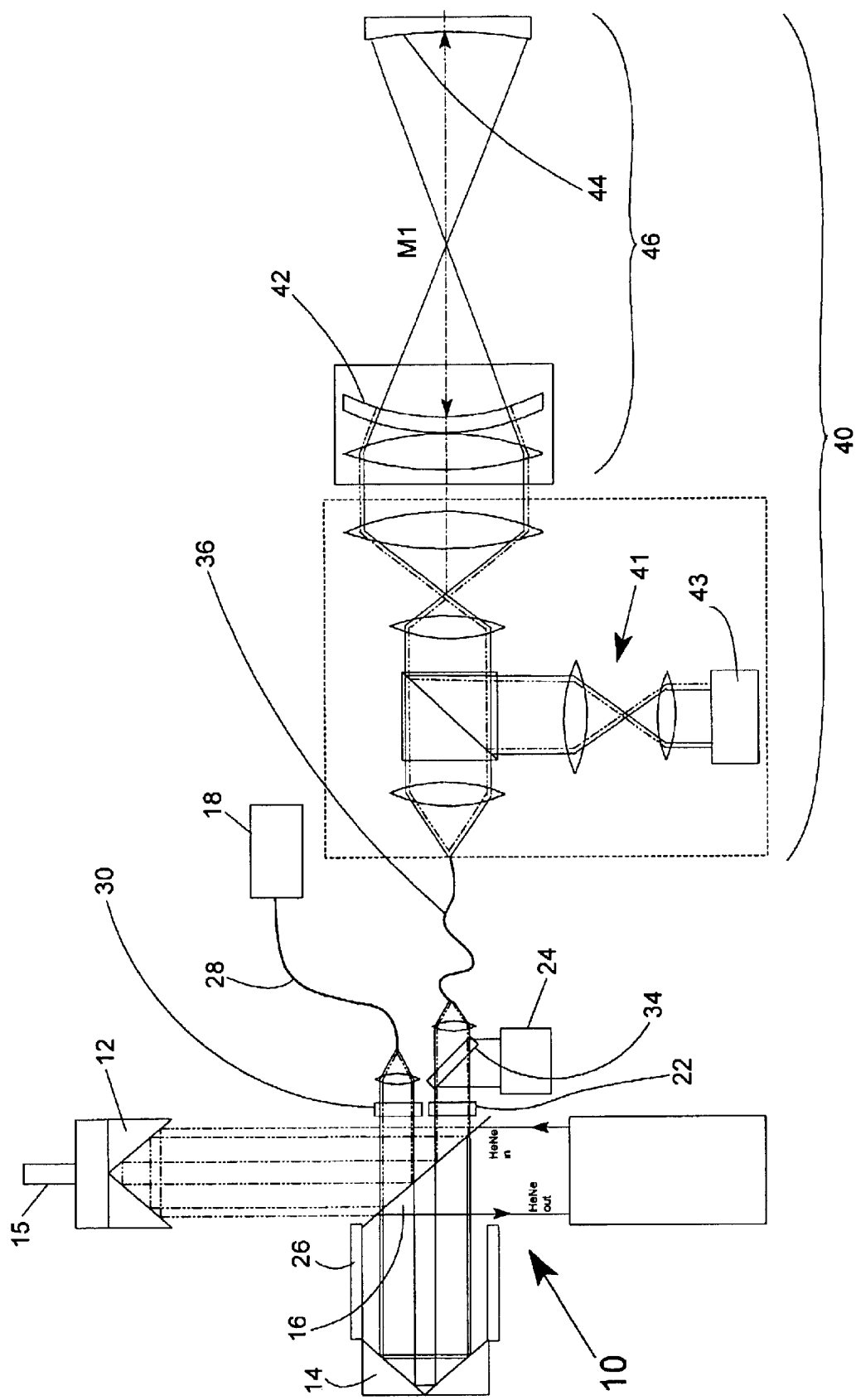
FIG. 2 is a diagrammatic plan view of the DMI of FIG. 1 shown integrated into a scanning delay line Fizeau.

In this configuration, when the two arms of the DMI 10 are exactly balanced, "zero" for subsequent measurement of the cavity length has been established. That is, the length of the measurement leg and reference have been set equal thus establishing a "zero" point serving to provide a reference position from which further movement of target 12 may be measured on a absolute basis. Having established a "zero point" in the interferometer 10, it may now be used in the configuration shown in FIG. 2 to measure the internal length of an interferometric Fizeau 40 having a cavity 46 defined by the sum of the radii of reference and test optics having, respectively, a reference surface 42 and test surface 44.

Fizeau 40 has a reference leg generally indicated at 41 in which a detector 43 resides to determine in a well-known manner a null condition between reference surface 42 and test surface 44. Signals from Fizeau 40 are sent to DMI 10 via a fiber/spatial filter 36 and pass through a beamsplitter 34 that serves to both couple signals from Fizeau 40 and direct signals from interferometer 10 to detector 24, which has been rotated 90 degrees with respect to its position in FIG. 1.

Fizeau 40 is first used to determine a null condition at which time its cavity length, M1, is equal to the sum of the radii of reference surface 42 and test surface 44, which may be any surface provided by a test element. Here, the distance the delay line must be moved such that the peak of the coherence envelope is found in interference between test surface 44 and reference surface 42 is the internal dimension of the Fizeau cavity, M1, the delay line being represented by the motion of the measurement leg of DMI 10 from the "zero" position. Provided that the reference optics are properly adjusted so that the reference surface 42 is exactly normal to the exiting wavefront, and the cavity 44 is adjusted to a perfect "null", then M1 is the sum of the radii of curvature of the test and reference surfaces. When the cavity 44 is not adjusted to a perfect null, M1 will be a biased estimate of the sum of the radii, and those skilled in the art will easily see a variety of techniques for correcting the bias. For example, an interferogram taken in the test cavity 44 will show a quadratic departure in the measured phase the sign of which changes as the cavity length is changed through the perfect condition. Thus, a series of measurements about this "perfect" null can be taken and interpolated to give M1 at ideal conditions.

Once the null condition has been acquired, the length of M1 is then measured absolutely by moving the target 12 of interferometer 10 from its "zero" position insisting that the distance it moves be equal to M1. Thus, a means are provided by which the length of cavity 46 can be measured which is defined by reference and test surfaces. When this is done for different combinations of reference and test optics, the radii of curvature of test optics can be determined on an absolute basis. This is done with the procedures to be described.

Consider the case (See FIG. 3) where there are two reference optics indicated as A and B (adjusted as indicated above) with radii of curvature $R_a$ and $R_b$ and a test object C with a radius of curvature $R_c$. Now, using the apparatus shown in FIG. 2, reference optic A is set up with test object C and the cavity length M1 is measured:

$$M1 = R_a + R_c$$

Figure 3:
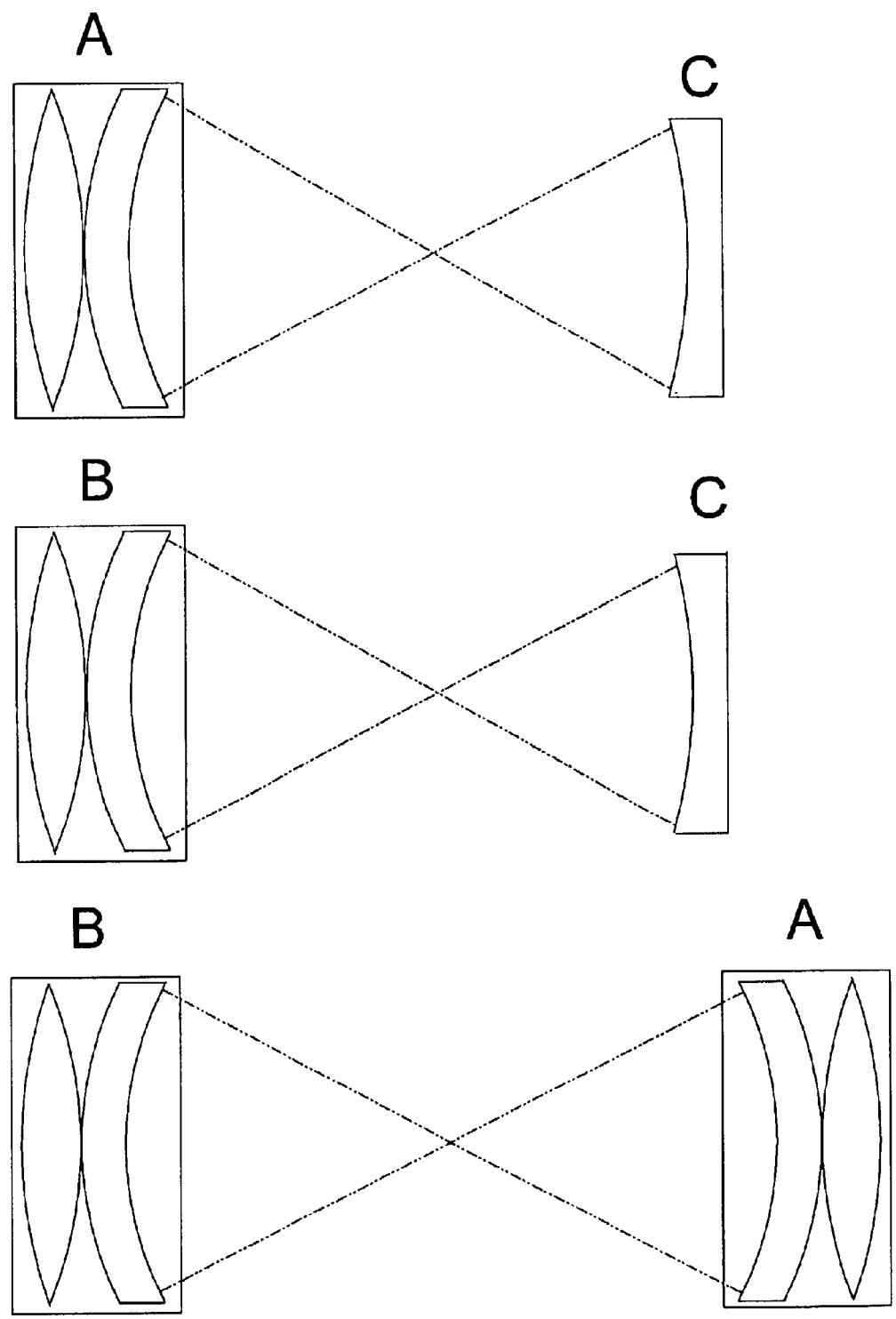
FIG. 3 is a diagrammatic plan view of various combinations of reference and test optics that may be employed in practicing the invention.

Obviously, the other two set-ups in FIG. 3 deliver:

$$M2 = R_b + R_c$$

$$M3 = R_b + R_a$$

Hence:

$$\frac{M1 + M2 - M3}{2} = R_c$$

and $R_a$ and $R_b$ may also be found.

This procedure is analogous to the well known 3-flat test, but it is believed not to be known for radius of curvature. The algorithm is also general, and may be used in any configuration which provides a measurement of the length of the spherical optical cavity 46, for example, Fourier Transform Phase Shifting Interferometer (FTPSI) (L. Deck) or multi-wavelength ranging. Once the radius of a reference artifact has been established, radius differences (between the artifact and another object) may also be evaluated using FTPSI or the scanning delay line Fizeau 40. The reference artifact may be measured using the procedure described above, or obtained from a calibration service.

Note also that the comparative approach described above is not limited to a Fizeau configuration. A Twyman-Green, for example, operating with a delay line or FTPSI will provide measurements of the cavity length change between measurements.

Other implementations falling within the scope of the invention will be apparent to those skilled in the art based on the foregoing disclosure and teachings and are intended to be within the scope of the invention.

What is claimed is:

1. A method for measuring the radii of curvature of a plurality of optics comprising the steps of:

mounting the optics pairwise in an interferometer so that the pair defines the interferometer cavity length;

measuring the interferometer cavity length along the axis for each pair of optics measured;

mathematically performing a pairwise intercomparison using the measured cavity lengths for each pair and relationships in which the measured cavity lengths are equated to the sum of the radii of curvatures of each pair corresponding to each measured cavity length; and determining the axial radius of curvature for each individual optic.

2. The method of claim 1 wherein:

$M1 = R_a + R_c$ $M2 = R_b + R_c$ $M3 = R_b + R_a;$ where M1, M2, and M3 are, respectively, the measured cavity length for each pair of optics defining the interferometer when its length is measured, $R_a$, $R_b$, and $R_c$ are the radii of curvature of the individual optics and:

$$\frac{M1 + M2 - M3}{2} = R_c$$

such that $R_a$ and $R_b$ may also be found.

3. The method of claim 1 wherein the interferometer is provided with an internal zero reference so that said cavity length measurements are made on an absolute basis.

4. The method of claim 3 wherein said internal zero reference is provided using a one of an optical delay and Fourier Transform Phase Shifting Interferometer (FTPSI).

* * * * *